Aug. 20, 1946.   L. H. STAUFFER   2,406,262
CURRENT COLLECTOR
Filed Oct. 8, 1943
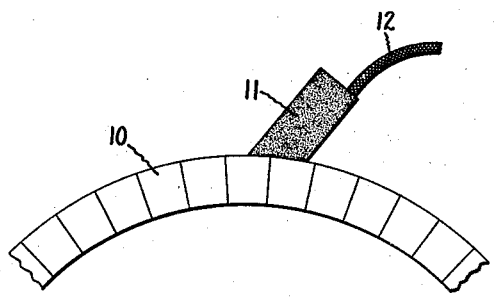
Inventor:
Lynn H. Stauffer,
by Harry C. Dunham
His Attorney.

Patented Aug. 20, 1946

2,406,262

UNITED STATES PATENT OFFICE 2,406,262

CURRENT COLLECTOR

Lynn H. Stauffer, Pattersonville, N. Y., assignor to General Electric Company, a corporation of New York Application October 8, 1943, Serial No. 505,447

6 Claims. (Cl. 171—320)

My invention relates to current collectors and particularly to current collecting devices such as are used with dynamoelectric machines and are adapted to be contacted by a brush.

An object of my invention is to provide an improved current collector made of a copper base alloy.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing shows a brush and a fragmentary view of a commutator embodying my invention.

Referring to the drawing, I have shown a current collector in the form of a commutator including a plurality of commutator bars 10 adapted to be contacted by a brush 11 made of any suitable material, such as carbon, and provided with a conventional pigtail conductor for providing an electrical connection between the brush 11 and a conventional brush holder terminal. It has been found that when current collectors operate in dry and rarefied atmospheric conditions, a carbon or graphite base brush tends to wear away very rapidly when the current collector which the brush contacts is formed of copper, as in the conventional construction. I have found that if the current collector member is formed of a copper base alloy including from 60% to 85% copper and 40% to 15% zinc, the life of the contact brush is greatly increased. In addition, I have found that if such a current collector alloy also is provided with a small percentage of lead or tin or both lead and tin, similarly greatly increased brush life may be expected. More specifically, the lead content should preferably be from 0.5% to 4% and the tin content from 0.5% to 2%. The following four compositions of this type alloy have been found to be particularly beneficial in increasing brush life when used in making commutators or collector rings:

| Alloy No. | Metal (percentages) | | | |
|---|---|---|---|---|
| | Copper | Zinc | Lead | Tin |
| 1 | 60 | 38.5 | 0.75 | 0.75 |
| 2 | 61.5 | 35.4 | 3.1 | 0 |
| 3 | 84 | 15 | 0 | 1 |
| 4 | 69 | 30 | 0 | 1 |

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A current collector member adapted to be contacted by a brush and for a dynamoelectric machine formed of a copper base alloy including from 60% to 85% copper and 40% to 15% zinc.

2. A current collector member adapted to be contacted by a brush and formed of a copper base alloy including from 60% to 85% copper and 40% to 15% zinc, with from 0.5% to 4% lead, and 0.5% to 2% tin.

3. A current collector member adapted to be contacted by a brush and formed of a copper base alloy including substantially 60% copper, substantially 38.5% zinc, 0.75% lead, and 0.75% tin.

4. A current collector member adapted to be contacted by a brush and formed of a copper base alloy including substantially 61.5% copper, substantially 35.4% zinc, and 3.1% lead.

5. A current collector member adapted to be contacted by a brush and formed of a copper base alloy including substantially 84% copper, substantially 15% zinc, and 1% tin.

6. A current collector member adapted to be contacted by a brush and formed of a copper base alloy including substantially 69% copper, substantially 30% zinc, and 1% tin.

LYNN H. STAUFFER.